(12) United States Patent
Dittmann et al.

(10) Patent No.: US 11,397,760 B2
(45) Date of Patent: Jul. 26, 2022

(54) MANAGING RELATIONSHIPS BETWEEN PERSONS AND PHYSICAL OBJECTS BASED ON PHYSICAL FINGERPRINTS OF THE PHYSICAL OBJECTS

(71) Applicant: International Business Machines Corporation, Armonk, NY (US)

(72) Inventors: Gero Dittmann, Zürich (CH); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 16/693,663

(22) Filed: Nov. 25, 2019

(65) Prior Publication Data

US 2021/0157827 A1 May 27, 2021

(51) Int. Cl.
*G06Q 30/06* (2012.01)
*G08B 13/24* (2006.01)
(Continued)

(52) U.S. Cl.
CPC ............ *G06F 16/289* (2019.01); *G06V 20/80* (2022.01); *G07C 9/257* (2020.01); *G07C 9/37* (2020.01); *G08B 13/2451* (2013.01)

(58) Field of Classification Search
CPC .............. G06F 16/289; G06F 16/9024; G06F 16/9554; G06F 3/04842; G06F 16/242;
(Continued)

(56) References Cited

U.S. PATENT DOCUMENTS 6,310,966 B1 * 10/2001 Dulude .................. G06Q 20/04
382/116
9,641,342 B2 5/2017 Sriram
(Continued)

FOREIGN PATENT DOCUMENTS

CN 106096443 A 11/2016
CN 107979467 A 5/2018
(Continued)

OTHER PUBLICATIONS

International Search Report and Written Opinion, International Application No. PCT/IB2020/060299, International Filing Date Nov. 3, 2020, 6 pages.
(Continued)

*Primary Examiner* — Dionne Pendleton
(74) *Attorney, Agent, or Firm* — Edward P. Li

(57) ABSTRACT

A computer-implemented method, a computer system, and a computer program product for managing relationships between persons and physical objects based on identifiers. A computer system configures a user device to be capable of interacting with each of a first database and a second database. The computer system verifies, by interacting with the second database, that a given object of the physical objects is a genuine object, based on a given object identifier of the given object and a digital fingerprint detected from a physical fingerprint of the given object. The computer system requests, via the first database, a transfer of a given relationship from a first person to a second person with respect to the given object, based on the given object identifier and a person identifier of the second person.

17 Claims, 4 Drawing Sheets

(51) Int. Cl.
*G06F 16/28* (2019.01)
*G07C 9/37* (2020.01)
*G07C 9/25* (2020.01)
*G06V 20/80* (2022.01)

(58) Field of Classification Search
CPC .......... G06F 16/90335; G06Q 30/0609; G06Q 10/08; G06Q 10/083; G06Q 10/087; G06Q 10/0875; G06Q 20/203; G06Q 30/0611; G06Q 30/0641; G06Q 30/0601; G06Q 30/04; G06Q 30/00; G06Q 30/0185; G06V 20/80; G06V 20/62; G06V 20/625; G06V 2201/08; G07C 9/257; G07C 9/37; H04W 4/40; H04L 67/12; H04L 2209/56; H04L 9/3236; H04L 9/50; G16H 10/60; G16H 40/20; G16H 40/67; G16H 50/20; G06K 19/06037; G06K 7/10366; G06K 7/1413; G06K 7/1417; G08B 13/2454; G08B 13/2451; G08B 13/2457; G08B 13/246; G08B 13/2462

See application file for complete search history.

(56) References Cited

U.S. PATENT DOCUMENTS

| | | | |
|---|---|---|---|
| 10,176,481 B2 | 1/2019 | Aljawhari | |
| 10,867,327 B1* | 12/2020 | Wilbert | G06Q 30/0611 |
| 2007/0017985 A1 | 1/2007 | Lapstun | |
| 2016/0300234 A1 | 10/2016 | Moss-Pultz | |
| 2017/0046806 A1 | 2/2017 | Haldenby | |
| 2017/0235896 A1* | 8/2017 | DeBusk | G06Q 10/0875 705/2 |
| 2017/0262862 A1* | 9/2017 | Aljawhari | G06F 16/242 |
| 2017/0300905 A1 | 10/2017 | Withrow | |
| 2018/0322491 A1 | 11/2018 | Madisetti | |
| 2019/0065788 A1 | 2/2019 | Vijayasankar | |
| 2021/0020012 A1* | 1/2021 | Shakedd | G06Q 30/0185 |

FOREIGN PATENT DOCUMENTS

| | | |
|---|---|---|
| CN | 108377187 A | 8/2018 |
| CN | 108471352 A | 8/2018 |
| WO | 2018128539 A1 | 7/2018 |
| WO | 2019040308 A1 | 2/2019 |
| WO | 2019045739 A1 | 3/2019 |

OTHER PUBLICATIONS

Dittmann, et al., "Secure Management of Ownership of Physical Objects", U.S. Appl. No. 16/693,692, filed Nov. 25, 2019.
Dittmann, Gero., "Managing Physical Objects Using Crypto-Anchors", U.S. Appl. No. 16/693,714, filed Nov. 25, 2019.
List of IBM Patent or Patent Applications Treated as Related. Filed Nov. 25, 2019. 2 pages.

* cited by examiner

MANAGING RELATIONSHIPS BETWEEN PERSONS AND PHYSICAL OBJECTS BASED ON PHYSICAL FINGERPRINTS OF THE PHYSICAL OBJECTS

BACKGROUND

The invention relates in general to the field of computerized methods and techniques for managing relationships between persons and physical objects. In particular, it is directed to methods to track such relationships using physical fingerprints of such objects.

There is an increasing need to track and trace relationships (such as ownerships) between persons and objects including physical objects, in particular in a context of ever-growing digital economy and prevalent transaction platforms. In such a context, it would often be desired to assure the authenticity of the physical objects.

Distributed ledgers, in particular blockchains, have gained considerable attention as a technology that increases trust and visibility along the supply chain for more accurate tracing of goods as well as asserting whether a product is genuine or fake. Trust and controlled visibility are achieved in blockchain systems with cryptography, distributed protocols, and privacy-enabling techniques, such as zero-knowledge or threshold-signature schemes. Complex manufacturing lines and supply chains can be securely monitored and documented such that downstream business processes can validate the provenance of an item. Likewise, upstream business processes can determine the recipients of goods, for instance in case of a product recall.

A blockchain or any other digital track-and-trace solution alone, however, is often not sufficient to prove originality or provide an uninterrupted chain of relationships throughout the product lifecycle.

SUMMARY

In one aspect, a computer-implemented method for managing relationships between persons and physical objects based on identifiers is provided. The computer-implemented method comprises configuring a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects. The computer-implemented method further comprises verifying, by interacting with the second database, that a given object of the physical objects is a genuine object, based on a given object identifier of the given object and a digital fingerprint detected from a physical fingerprint of the given object. The computer-implemented method further comprises requesting, via the first database, a transfer of a given relationship from a first person to a second person with respect to the given object, based on the given object identifier and a person identifier of the second person.

The present method can be used to securely track relationships between persons and physical objects. The above scheme leads to verify whether an object is genuine prior to transferring a given relationship from a first person to a second person (e.g., from a seller to a buyer of this object), by interacting with databases thanks to a suitably configured user device. The same steps can then be repeated as long as necessary to perform further transactions. The same approach can also be used to track custody or any other type of relationships to such objects, e.g., in a company.

In embodiments, verifying the genuineness of the given object further comprises detecting, with the user device, the DFP from the physical fingerprint of the given object. Preferably, this verification further comprises detecting the given object ID with the same computerized device as used for detecting the DFP.

Interacting with the second database may notably comprise communicating the given object ID and the DFP detected to the second database, and receiving confirmation from the second database that the object ID and the DFP communicated to the second database match a pair of an object ID and a DFP as stored on the second database.

In preferred embodiments, the first person and the second person respectively correspond to a first person ID and a second person ID as stored on the first database, and requesting the transfer further comprises communicating the given object ID and the second person ID from the first database to a further computerized device, the latter associated with the first person, in view of obtaining approval of the transfer by the first person.

Then, the method preferably comprises communicating an approval message from the further computerized device to the first database, upon the first person approving the transfer via the further computerized device. In addition, the method may advantageously include, at the first database and upon receiving the approval message, registering the transfer of the given relationship by storing the second person ID, so as for the second person ID to be associated with the given object ID, whereby the second person ID now identifies the second person as having the given relationship to the given object in the first database. Preferably then, the method further comprises notifying a confirmation of the transfer of the given relationship by communicating a corresponding message to the user device.

In typical embodiments, the relationships are ownership relations, whereby the transfer requested is a transfer of ownership.

In embodiments, the method further comprises, for each object of the physical objects, a set of preparatory steps, the latter comprising: associating the each object with its respective object ID; obtaining a respective DFP from the physical fingerprint of the each object; on the first database, storing the respective object ID and a person ID, so as for the person ID to be associated with the object ID in the first database, the person ID identifying a person as currently known to have a relationship to the each object; and on the second database, storing the respective object ID and the respective DFP, so as for the respective DFP to be associated with the object ID.

Preferably, the preparatory steps are performed as part of a commissioning of the physical objects, e.g., by a trusted back-end system.

In embodiments, the preparatory steps are performed using a computerized system of a manufacturer of the physical objects, and each of the first database and the second database is an external database, i.e., distinct from the computerized system, but in data communication with this computerized system. Advantageously, one or each of the first database and the second database is a distributed system configured as a shared ledger.

In preferred embodiments, the method further comprises downloading, installing, and executing a program on the user device, wherein executing the program causes to configure the user device for it to be able to interact with each of the first database and the second database.

In another aspect, a computer system for managing relationships between persons and physical objects based on identifiers is provided. The computer system comprises one or more processors, one or more computer readable tangible storage devices, and program instructions stored on at least one of the one or more computer readable tangible storage devices for execution by at least one of the one or more processors. The program instructions are executable to: configure a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects; verify, by interacting with the second database, that a given object of the physical objects is a genuine object, based on a given object identifier of the given object and a digital fingerprint detected from a physical fingerprint of the given object; and request, via the first database, a transfer of a given relationship from a first person to a second person with respect to the given object, based on the given object identifier and a person identifier of the second person.

In preferred embodiments, the device is further configured to directly detect the DFP from a physical fingerprint of a given object. Preferably, the device is further configured to automatically connect to the second database in view of verifying that the given object is a genuine object, upon detecting a DFP and automatically connect to the first database in view of requesting the transfer, upon obtaining confirmation from the second database that that the given object is a genuine object.

In embodiments, the device is a smartphone and the instructions comprises specific instructions of an application program installed on the smartphone, wherein the specific instructions are executable by the processing means, so as to cause to configure the user device for it to be able to interact with each of the first database and the second database.

In yet another aspect, a computer program product for managing relationships between persons and physical objects based on identifiers is provided. The computer program product comprising one or more computer-readable tangible storage devices and program instructions stored on at least one of the one or more computer-readable tangible storage devices. The program instructions are executable to configure a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects. The program instructions are further executable to verify, by interacting with the second database, that a given object of the physical objects is a genuine object, based on a given object identifier of the given object and a digital fingerprint detected from a physical fingerprint of the given object. The program instructions are further executable to request, via the first database, a transfer of a given relationship from a first person to a second person with respect to the given object, based on the given object identifier and a person identifier of the second person.

BRIEF DESCRIPTION OF THE SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present invention.

The accompanying drawings show simplified representations of devices or parts thereof, as involved in embodiments. Similar or functionally similar elements in the figures have been allocated the same numeral references, unless otherwise indicated.

DETAILED DESCRIPTION

Typically, in prior art solutions for managing physical objects, an object is linked to a digital record by an object identifier (object ID), such as a unique identifier (UID), that represents either the individual object or a class of objects by model, batch, production site, manufacturer, or similar. The UID is printed, embossed, or attached as a tag to the object or its packaging. How can the object ID be associated with a person identifier to track who corresponds to the legitimate owner? How can custody of the object be tracked, e.g., to track responsibility for high-value machinery that is being passed around within an organization? The embodiments of the present invention disclose solutions that can be made generic enough to support all sorts of objects from any vendor and many types of relationships between persons and objects, so as to provide platforms for a variety of use cases.

Figure 1:
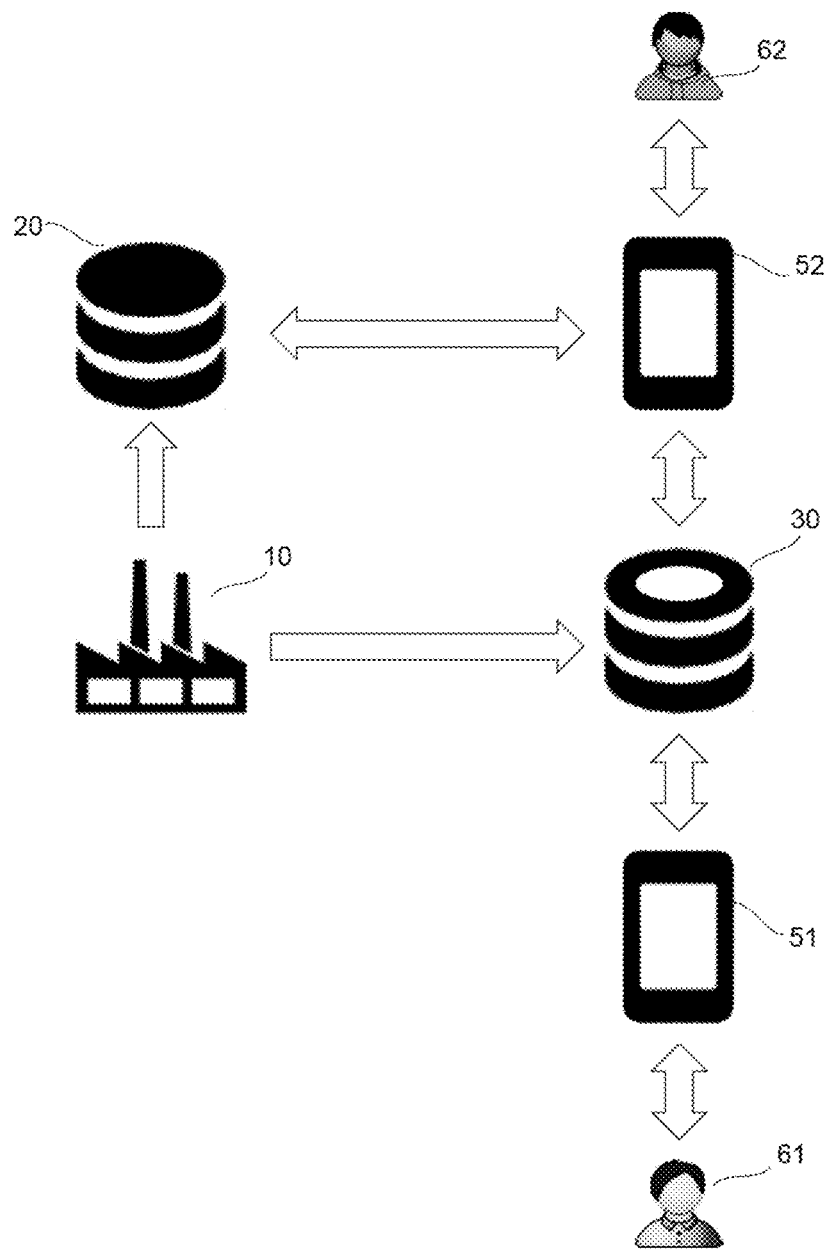
FIG. 1 depicts selected components and actors of a system that can be used to perform steps for managing physical objects, in accordance with one embodiment of the present invention.
Figure 2:
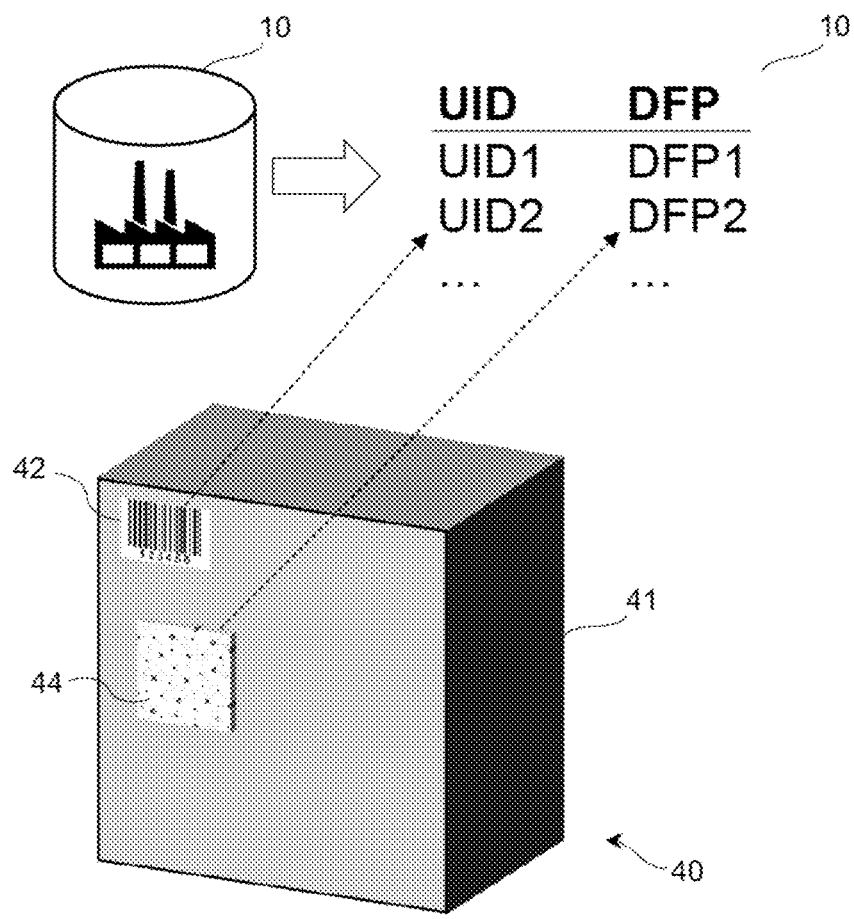
FIG. 2 schematically illustrates how a manufacturer may associate unique identifiers of physical objects with digital fingerprints obtained from unique physical properties of physical anchors affixed to the physical objects, in accordance with one embodiment of the present invention.
Figure 3:
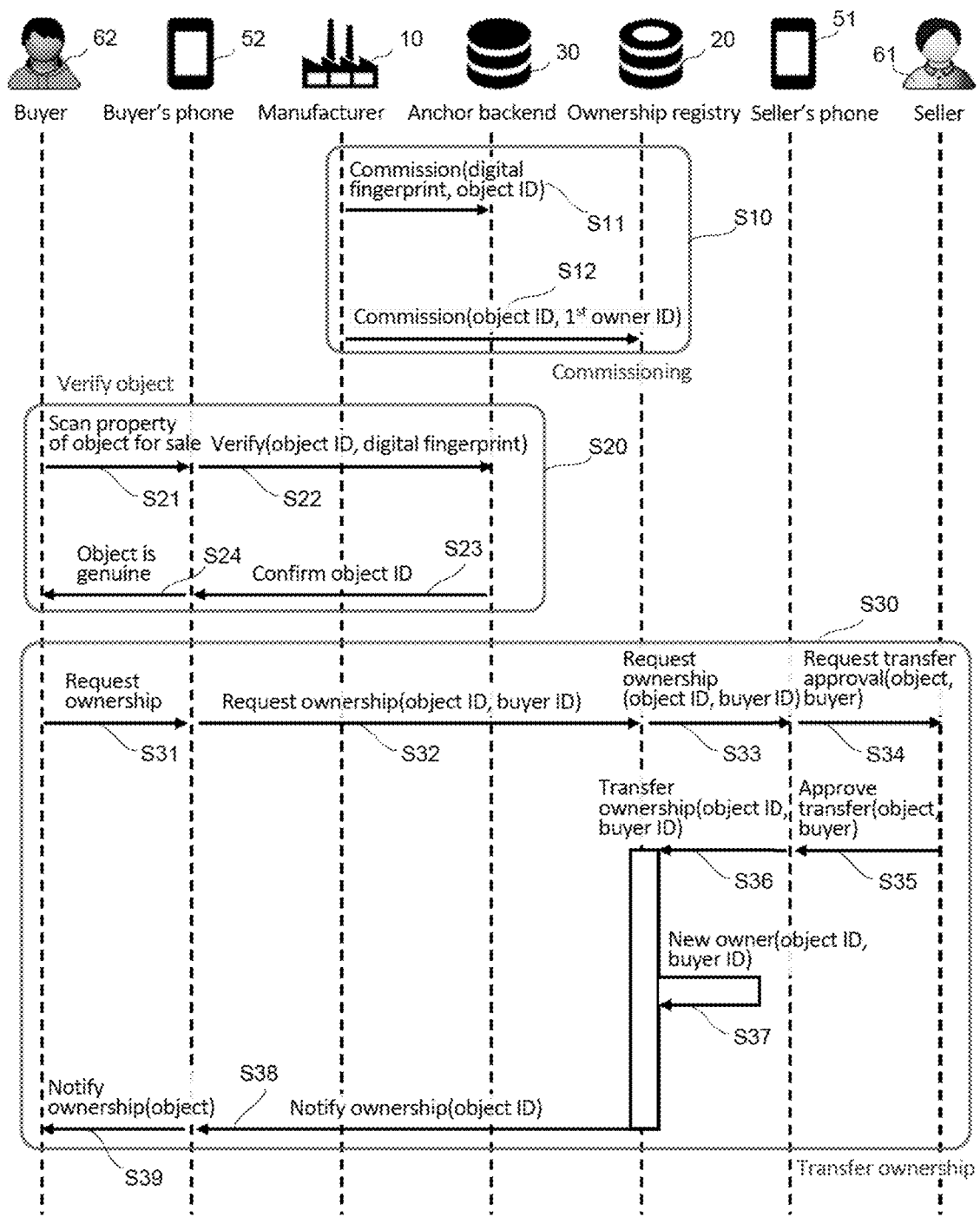
FIG. 3 is a flowchart illustrating high-level steps for managing physical objects, in accordance with one embodiment of the present invention.

In reference to FIG. 1, FIG. 2, and FIG. 3, an aspect of the invention is first described, which concerns a method for managing relationships between persons 61, 62 and physical objects 40 based on identifiers (hereafter IDs). This method and its variants are collectively referred to as the "present methods" in this document.

The present methods comprise a series of steps, which are at least partly performed at a user device 52, e.g., most practically a smartphone or a tablet. Such steps are now described in detail.

The present methods start with configuring the user device 52 for it to be able to interact with each of a first database 20 and a second database 30. That is, the user device 52 need be configured to be able to access each of the two databases and exchange data therewith. This configuration step may, for example, be automatically performed by downloading a dedicated application and running this application, e.g., during a preliminary process.

The first database 20 stores pairs of object IDs and person IDs. Such pairs establish associations between the object IDs and person IDs. The object IDs identify respective physical objects, while a respective one of the person IDs identifies a person having a relationship to a respective one of the physical objects. Thus, in the first database, the person IDs are respectively associated with the object IDs. In practice, an object ID typically indexes a person ID, which implicitly establishes an association between the IDs. This association reflects a relationship between the corresponding person and object. Additional attributes may be stored as well, specifying the type of relationship, if necessary. Any kind of relationships can be contemplated, starting with ownerships. The first database 20 may thus typically be an ownership database (i.e., an ownership registry), meant to keep track of owners of objects, as assumed in the accompanying drawings.

The second database 30 stores pairs of object IDs and digital fingerprints (hereafter DFPs), where the DFPs are derived from physical fingerprints of the physical objects. The second database 30 is typically a back-end system. The pairs reflect relationships between object IDs and DFPs. The DFPs are respectively associated with the object IDs. Objects IDs may index DFPs in the second database 30. The second database 30 is referred to as an anchor backend in the accompanying drawings, because it stores crypto-anchors tying the UIDs of the objects with unique, physical properties of the objects (by way of the DFPs), which properties are typically hard to clone, forge, and transfer to another object.

The two databases 20 and 30 may possibly be implemented in a same database, where each of the two databases includes a subset of entries of the overall database. In preferred variants, however, the two databases are implemented as fully distinct databases, which are more preferably supported by distinct physical systems. The databases will, in all cases, store distinct pairs of digital objects, through such pairs are connected by the same object IDs. Although the present approach may involve central databases, distributed systems such as blockchains are particularly attractive, especially when seeking vendor-neutral platforms, as discussed later in detail.

Next, the user device 52 is used to verify that a given object 40 is a genuine object, by interacting with the second database 30, see the process S20 of the flowchart in FIG. 3. The verification process is controlled from the user device 52, and preferably initiated by this device, e.g., automatically upon detecting a DFP. The verification process needs a given object ID and a corresponding DFP, where the latter is detected (step S21 shown in FIG. 3) from a physical fingerprint of the object at issue. The user device is preferably configured to directly perform the detection (step S21), as discussed later.

Finally, after having verified (in process S20) the genuineness of an object, the user device 52 is used to request (step S31-step S34 shown in FIG. 3) a transfer, via the first database 20, of a given relationship from a first person 61 to a second person 62 with respect to the object considered. The transfer is requested based on the relevant object ID and a person ID corresponding to the second person.

The present method can be used to securely track relationships between persons 61, 62 and physical objects 40. Such relationships typically relate to real rights. More generally, they may concern any type of relationship between a thing and a person (a physical person or a legal entity). Such relationships may originate from statutory law or have a contractual origin, for example. They may impose and thus include obligations on persons relating to physical objects; they notably encompass responsibility and accountability. For example, relationships considered herein may notably concern ownership, tenancy, possession, custodianship, rights of use, security interests, or any other interest or role of a person with respect to a physical object. Still, the relationships will typically be ownership relations in practice, such that the transfer process (step S31-step S34) will typically be a transfer of ownership, which may involve a suitable transaction protocol.

A physical object as understood herein should be interpreted in a broad sense (it excludes human beings, though). It can be any item, substance, device, or even a system, and, more generally, a thing, that is, anything that has been or can be associated with a unique physical property, wherein this property can be detected deterministically.

The object ID is normally a UID, allowing an object to be unambiguously identified. UIDs are assumed in the following. As usual, object IDs can for instance be encoded in linear or 2D barcodes stuck on respective objects or packages thereof. In prior art solutions, many of these UIDs can be easily copied or transferred to a clone of the object. Hence, an identifier alone cannot uniquely and securely identify, i.e., authenticate an object. In addition, and as noted in the background section, a classic digital track-and-trace solution is normally not sufficient to prove originality. Only when trust from the digital domain is extended to the physical domain, product originality can be determined and the movement of goods can be accurately traced. For applications related to proof of authenticity and track and trace, a tight link between physical objects and their digital representation is essential. That is, the physical object must be tied to its associated digital record, hence the benefit of relying on digital fingerprints, in addition to UIDs, as proposed herein.

The digital fingerprint is typically a number, a string, or any combination of characters (possibly including digits and other characters), or, more generally, a dataset that reflects the unique property (or a set of unique properties). Such a physical property should be understood in a broad sense, as it may include a mechanical, optical, electrical, or even a chemical or biological property of this object, or combinations thereof. It may for example stem from a physical fingerprint (such as a surface structure) or embedded security features (as in banknotes). This property may notably be provided by a physical anchor 44, added on purpose to the object 40 (see FIG. 2), as discussed later. In all cases, a respective one of the DFPs is impacted by a unique physical property of a respective object.

The above scheme leads to verify whether an object is genuine prior to transferring a given relationship from a first person to a second person (e.g., from a seller 61 to a buyer 62 of this object), by interacting with databases 20 and 30 through a suitably configured user device. For example, a buyer 62 may request a transfer of ownership directly at the first database 20 of an object, after having obtained confirmation of the genuineness of the object by interacting with the second database 30. The first database 20 may then forward all necessary data for the seller 61 to approve the request, such that the first database 20 may eventually record the change of ownership, for example. The same steps can then be repeated as long as necessary to perform further transactions. The same approach can also be used to track custody or any other type of relationships to such objects, e.g., in a company.

The present approach makes it notably possible to manage objects associated with legitimate owners, or to track responsibility for high-value machinery that is being passed around within an organization, for example. The solution proposed is generic to support all sorts of objects from any vendor; it may accordingly provide a platform compatible with a variety of use cases.

All this is now described in detail, in reference to particular embodiments of the invention. To start with, each object 40 preferably comprises a physical anchor 44 (see FIG. 2), which is designed so as to exhibit the unique physical property. Thus, the DFP obtained at step S21 is impacted by the unique physical property of the physical anchor 44 of a respective object 40. The physical anchor 44 may, for example, be unalterably affixed to (entangled with) the object, for example the object 40 itself or a main functionality thereof, with a strong adhesive or in a way that irrevocably alters the exploited property. The anchor 40 may also be integrated, in an inalterable way, in a body of the object. Anchors may, for example, include embedded security features (e.g., microprinting, security ink, or hologram) and/or physical fingerprints (e.g., a physical unclonable function).

The physical anchor can be affixed to a product or an item, or its packaging (which itself is or comprises an object). The trust-anchor is established for the object bearing the physical anchor. Thus, protection is achieved for the actual object whose unique physical property is exploited. Accordingly, the physical property is preferably extracted from a physical anchor that is tied to the product or item to be sold, rather than its packaging.

In variants to physical anchors, which are specific objects provided on purpose, one or more physical properties of the primary object 40 itself may be exploited, such as a surface state, a precise weight, etc., without it being needed to explicitly attach a physical anchor to the object. Physical anchors, however, will normally make it easier to achieve unique physical properties, in a more systematic and controllable way. Still, inherent physical anchors (which can normally not be controlled) would inherently provide a larger degree of entropy, which make them more difficult to clone. In contrast, physical anchors provided on purpose are, in principle, easier to attack precisely because they are more controllable and systematic. Thus, the uniqueness of explicit physical anchors must be generated with some effort.

The user device 52 is preferably configured to perform the detection (step S21) itself, for practical reasons. The user device is thus preferably used to detect (step S21) the DFP from the physical fingerprint of the given object, as assumed in the flowchart of FIG. 3. In variants, the DFP detection is performed via another device in data communication with the user device 52, such that the latter can still be used to perform (e.g., initiate) the verification process by passing relevant data (object ID and corresponding DFP) to the second database 30.

Similarly, the user device 52 is preferably configured to perform the detection of the object ID, e.g., based on a barcode 42 paired to the object, see FIG. 2. Thus, the user device 52 is preferably used to detect (step S21) the object ID, such that a same computerized device 52 may eventually be used for detecting (step S21) both the object ID and the corresponding DFP, as well as for initiating the verification process (step S20 shown in FIG. 3) and requesting (process S30 shown in FIG. 3) the transfer of relationship. This makes the method efficiently controlled from a same device 52 (e.g., the buyer's device, as assumed in the accompanying drawings).

All this may, for example, be carried out by using a suitably configured device 52, e.g., a smartphone or a tablet with a suitable application installed thereon. In variants, an optical device may also be used along with dedicated software, e.g., applying computer vision and image processing techniques to glean information digitally by optically scanning the object 40 (or a physical anchor 44 thereof), and a barcode 42 paired to it, as assumed in the example of FIG. 2.

In embodiments, the interactions (in process S20) with the second database 30 notably comprises communicating (again from the user device 52 at step S22) the object ID of a given object and a corresponding DFP (as detected at step S21) to the second database 30. A confirmation from the second database 30 may subsequently be received (step S23) by the user device 52, indicating that the object ID and the DFP communicated to the second database 30 match a pair of object ID and DFP as stored thereon. Such a confirmation means that the object is indeed a genuine object, as interpreted (step S24) by the user 62. On the contrary, a standard error message would be sent where no match is found, e.g., inviting the user 62 to repeat the scans (step S21) or log the failed scan as an incident.

The transfer process S30 involves a first person 61 and a second person 62, who respectively correspond to a first person ID and a second person ID as stored on the first database 20. Thus, the transfer process S30 may require some data communication between the two databases 20 and 30. In particular, upon triggering the transfer from the user device 52 (in respect of a given object), the first database 20 may communicate (step S33) a corresponding object ID, as well as the second person ID (who typically corresponds to the user 62 of the device 52 in case of ownership transfers) to a computerized device 51. The latter is typically associated with the first person 61 (especially in case of ownership transfers) and may for example be a tablet or a smartphone, as assumed in the accompanying drawings). Step S33 is performed in view of obtaining (steps S34 and S35 shown in FIG. 3) approval of the transfer of relationship by the first person 61. In variants, the approval may be obtained from a third party.

As further illustrated in FIG. 3, an approval message shall preferably be received upon the first person 61 approving (at step S35) the transfer via the computerized device 51. The latter may be used to communicate (at step S36 shown in FIG. 3) an approval message to the first database 20.

Then, upon receiving the approval message, the first database 20 will typically register (at step S37 shown in FIG. 3) the transfer of relationship by storing the second person ID. From now on, the second person ID is accordingly associated with the given object ID. That is, the second person ID now identifies the second person 62 as having the relationship to the given object 40 in the first database 20. Additional attributed may be stored or updated on this occasion. In particular, the first database 20 may keep records of the first person ID, as well as all person IDs that were previously associated with the given object ID, for tracking and tracing purposes.

Subsequently, a confirmation of the transfer of the relationship may possibly be notified (at step S38 shown in FIG. 3) by the first database 20, by communicating a corresponding message to the user device 52. The user 62 (e.g., the buyer) will accordingly be informed (at step S39 shown in FIG. 3) that the ownership transfer has been registered.

In embodiments, the present methods further comprise a set of preparatory steps performed for each object 40 of the physical objects. They may notably comprise associating (in process S10) each object 40 with its respective object ID and obtaining (in process S10) a respective DFP from the physical fingerprint of this object. Then, pairs of object IDs and person IDs are stored (step S12) on the first database 20, so as for each person ID to be associated with a respective object ID in the first database 20. The person ID identifies a person as currently known to have a relationship to the associated object. This person may for example be the first, legal owner of the object, e.g., the (legal) entity who initially instructed to manufacture the object. This may also be a purchaser of the object, if already known, or a current owner. In addition, pairs of object IDs and respective DFPs are stored (step S11) on the second database 30, so as for DFPs to be respectively associated with object IDs on this database 30.

The above preparatory steps are preferably performed as part of commissioning (process S10) the objects, as assumed in the following. In the present context, commissioning objects means readying the objects for their lifecycle management. The commissioning step can also be regarded as a set of preparatory steps to bring the objects into working condition or market such objects. Typically, batches of numerous, similar objects need be commissioned at the same time by manufacturers. Thus, the commissioning process typically deals with sets of objects. The commissioning process is generally referred to by process S10 in the flowchart shown in FIG. 3. Process S10 is preferably performed by a trusted entity, typically the manufacturer 10 or an initial legal owner of the objects, or under control of this owner or the manufacturer, preferably at the manufacturer's site, e.g., by a trusted back-end system at the manufacturer's site.

Figure 4:
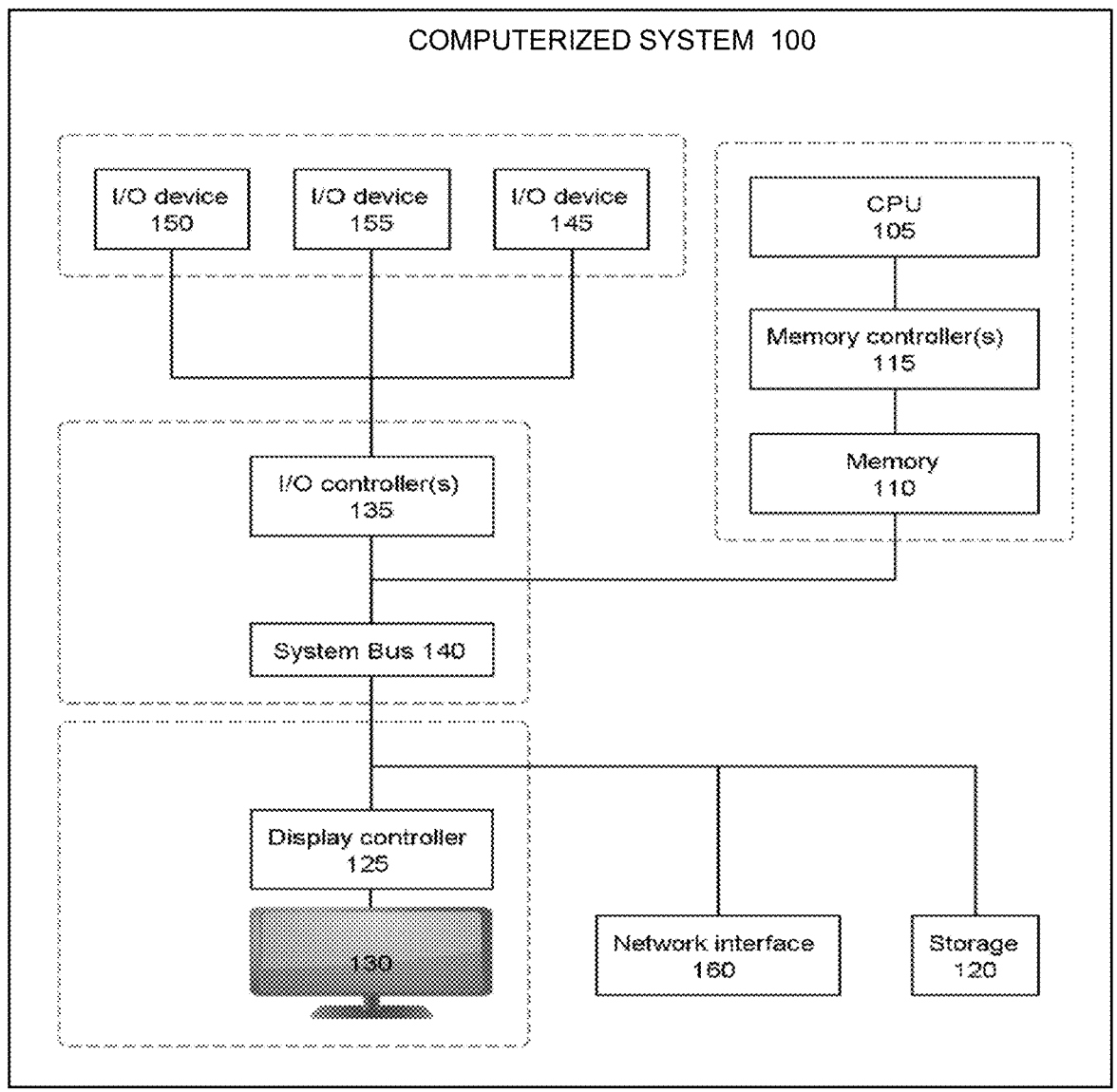
FIG. 4 schematically represents a computing system for implementing steps for managing physical objects, in accordance with one embodiment of the present invention.

The back-end system will typically involve one or more computerized systems 100 such as depicted in FIG. 4. Furthermore, each of the first database 20 and the second database 30 is preferably an external database.

Cryptographic signatures from the manufacturer are likely involved at some point. For example, a signature can be verified prior to download the application running on the user devices 51 and 52. In variants, the object DFPs as stored on the second database 30 may be signed and the DFPs may be verified at the user device 52 prior to a request for a transfer process S30 of ownership, for example. Any public key infrastructure (PKI) may be involved.

As mentioned earlier, the present methods may further comprise downloading, installing, and executing a program on the user device 52, during a preliminary process. Executing this program will cause to suitably configure the user device 52 to be able to interact with each of the first database 20 and the second database 30. The same application program may for instance be downloaded and executed on the user devices of all participants 51 and 52.

One or each of the databases 20 and 30 may possibly be a distributed system, preferably configured as a shared ledger. The shared ledger may notably be configured as a blockchain, and more preferably as a business blockchain such as the so-called Hyperledger Fabric, or a similar blockchain relying on a consensus algorithm that is less compute-intensive than the so-called Proof-of-Work variant.

Various scenarios can be contemplated. In a first scenario, the anchor backend 30 is a trusted backend and the first database 20 can be configured as a shared ledger. Because the anchor backend 30 is a trusted backend, it is trusted that the physical identities of objects cannot be forged. Since the first database 20 is a shared ledger, the transactions recorded in the ledger cannot be forged either.

In variants, each database is implemented as a shared ledger, e.g., a blockchain whose integrity is ensured by smart contracts and other security mechanisms characteristic of a blockchain. Thus, each database can either be a database controlled and protected by a trusted entity (e.g., by the manufacturer) and therefore trusted or a shared ledger. In other variants, the two databases can be combined in one system, as noted earlier.

A blockchain is an attractive back-end platform in the present context, as it is distributed, immutable, highly available, and be independent of object manufacturers and vendors if suitably set up. In variants, a central database may be used. However, a central database might be subject to attacks and a single point of failure, not least if the manufacturer goes out of business. Thus, relationships transactions can advantageously be stored on a blockchain, where distribution and consensus algorithms improve the robustness against failure and fraud.

The above embodiments have been succinctly described in reference to the accompanying drawings and may accommodate a number of variants. Several combinations of the above features may be contemplated.

For example, referring to FIG. 3, the present methods may comprise a commissioning process S10, during which a back-end system of a manufacturer exports (steps S11 and S12). In some embodiments, pairs of DFPs and object IDs to a database 30 (namely a trusted anchor backend). In some other embodiment, pairs of object IDs and related person IDs to another database 20 (an ownership database).

A buyer 62, willing to purchase a given object 40, may first want to verify the genuineness of this object, during a next process S20. To that aim, the buyer 62 may, using her/his suitably preconfigured phone 52, scan (step S21) a physical fingerprint (e.g., a physical anchor) of the object for sale, using a dedicated application, which then automatically connects to the database 30 and requests the database 30 to verify that the object is genuine by forwarding (step S22) the object ID and the corresponding DFP. If a match is found, the database 30 confirms (step S23), e.g., with a message including the object ID. The message is displayed (step S24) on the user device 52 and interpreted by the user 62.

Having obtained confirmation of the genuine character of the object, the buyer 62 may then, using the device 52, request (step S31) to transfer (in process S30) ownership of the object, during a further process (in process S30). To that aim, the device 52 sends (step S32) a request containing the object ID and the ID of the buyer 62 to the database 20, which forwards (step S33) it to the device 51 of the seller 61. Prompted (step S34) by his/her device 51, the seller 61 may approve (step S35) (e.g., press "OK"), which translates into an approval instruction (step S36) sent to the database 20. The database 20 will accordingly register (step S37) the new owner 62 and accordingly notify (steps S38 and S39) the buyer 62, via the device 52.

Referring to FIG. 1 and FIG. 4, another aspect of the invention is now described, which concerns a computerized device 52 for managing relationships between persons 61, 62 and physical objects 40 based on IDs. Functional aspects of such a device have already been described in reference to the present methods. Such a device 52 is thus only succinctly described in the following.

The device 52 may, for example, be a smartphone, a tablet, or any kind of computerized optical device. The device 52 may thus generally have same functionalities as the computerized system 100 such as depicted in FIG. 4. Similar or comparable computerized system 100 may further be used by all participants 61 and 62, and involved at the manufacturer 10, as well as at the first and second databases 20 and 30. More details as to such computerized system 100 are given in the later paragraphs with reference to FIG. 4.

In particular, the device 52 shall typically include storage means 110 storing instructions, as well as processing means 105 configured to execute the instructions, in view of performing steps as described earlier in reference to the present methods.

Namely, executing the instructions will cause to configure the user device for it to be able to interact with each of the first and second databases 20 and 30. In particular, the instructions may comprise specific instructions of an application program installed on the smartphone, where the specific instructions are executable by the processing means 105, so as to cause to configure the user device 52 for it to be able to interact with the first and second databases 20 and 30.

Executing the instructions may further cause the device 52 to verify (in process S20), by interacting with the second database 30, that a given object 40 is a genuine object, based on a corresponding object ID and a DFP as detected (at step S21) from a physical fingerprint of this object. As discussed earlier, the computerized system 100 is preferably configured so as to be able to directly detect (at step S21) a DFP from the physical fingerprint of a given object. Finally, the device 52 may, in operation, be used to request (step S31-step S34), via the first database 20, a transfer of a given relationship from a first person 61 to a second person 62 with respect to the object, based on the corresponding object ID and the person ID of the second person, as explained earlier.

The device 52 may possibly be configured to automatically connect to the second database in view of verifying (in process S20) that a given object 40 is a genuine object, upon detecting a corresponding DFP. Similarly, the device 52 may automatically connect to the first database in view of requesting (step S31-step S34) the transfer, upon obtaining confirmation from the second database that that the given object 40 is a genuine object. Conversely, the device may be prevented to request the transfer is the second database informs the genuineness of the object.

Because the device 52 comes to interact with other computerized entities 20 and 30, instructions executed by processing means 105 of this device 52 may for instance be executed jointly with other instructions at other computerized entities by processing means of the computerized system 100, as necessary to perform such steps, in operation.

Next, according to a final aspect, the invention can also be embodied as a computer program product for managing relationships between persons 61 and 62 and physical objects 40. Briefly, the computer program product comprises a computer readable storage medium having program instructions embodied therewith, wherein the program instructions are executable by one or more processors of a user device (such as the device 52), to cause to the latter to implement steps according to the present methods.

Computerized devices can be suitably designed for implementing embodiments of the present invention as described herein. For instance, the computerized system 100 depicted in FIG. 4 schematically represents a general-purpose computer. In exemplary embodiments, in terms of hardware architecture, as shown in FIG. 4, the computerized system 100 includes a processor 105, memory 110 coupled to a memory controller 115, and one or more input and/or output (I/O) devices 145, 150, and 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computerized system 100, a semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 4, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145, 150, and 155 may include other hardware devices.

In addition, the I/O devices 145, 150, and 155 may further include devices that communicate both inputs and outputs. The computerized system 100 can further include a display controller 125 coupled to a display 130. In exemplary embodiments, the computerized system 100 can further include a network interface or transceiver 160 for coupling to a network. The network transmits and receives data between the computerized system 100 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the computerized system 100 and any external server, client and the like via a broadband connection. In exemplary embodiments, network can be a managed IP network administered by a service provider. Besides, the network can be a packet-switched network such as a LAN, WAN, Internet network, etc.

If the computerized system 100 is a PC, workstation, intelligent device or the like, the software in the memory 110 may further include a basic input output system (BIOS). The BIOS is stored in ROM so that the BIOS can be executed when the computerized system 100 is activated.

When the computerized system 100 is in operation, the processor 105 is configured to execute software stored within the memory 110, to communicate data to and from the memory 110, and to generally control operations of the computerized system 100 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing relationships between persons and physical objects based on identifiers, the computer-implemented method comprising:
   configuring a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects;
   verifying, by interacting with the second database, that a given object of the physical objects is a genuine object, based on a given object identifier of the given object and a digital fingerprint detected from a physical fingerprint of the given object;
   requesting, via the first database, a transfer of a given relationship from a first person to a second person with respect to the given object, based on the given object identifier and a person identifier of the second person; and
   performing preparatory steps, the preparatory steps comprising:
   associating the physical objects with respective ones of the object identifiers;
   obtaining the digital fingerprints from respective ones of the physical fingerprints of the physical objects;
   on the first database, storing the object identifiers and the person identifiers, so as for the person identifiers to be associated with the respective ones of the object identifiers in the first database, a respective one of the person identifiers identifying a person as currently known to have a relationship to a respective one of the physical objects; and
   on the second database, storing the object identifiers and the digital fingerprints, so as for the digital fingerprints to be associated with the respective ones of the object identifiers; and
   wherein the preparatory steps are performed using a computerized system of a manufacturer of the physical objects, wherein each of the first database and the second database is an external database, distinct from the computerized system but in data communication with the computerized system.

2. The computer-implemented method of claim 1, further comprising:
   detecting, with the user device, the digital fingerprint from the physical fingerprint of the given object.

3. The computer-implemented method of claim 1, further comprising:
   detecting the given object identifier with the user device which has been used for detecting the digital fingerprint.

4. The computer-implemented method of claim 1, further comprising:
   communicating the given object identifier and the digital fingerprint to the second database; and
   receiving a confirmation from the second database that the given object identifier and the digital fingerprint match a pair of an object identifier and a digital fingerprint stored on the second database.

5. The computer-implemented method of claim 1, wherein the first person and the second person respectively correspond to a first person identifier and a second person identifier as stored on the first database, wherein requesting the transfer further comprises communicating the given object identifier and the second person identifier from the first database to a further computerized device, in view of obtaining approval of the transfer by the first person, wherein the further computerized device is associated with the first person.

6. The computer-implemented method of claim 5, further comprising:
   upon the first person approving the transfer via the further computerized device, communicating an approval message from the further computerized device to the first database.

7. The computer-implemented method of claim 6, further comprising:
   upon receiving the approval message, registering, at the first database, the transfer of the given relationship by storing the second person identifier, so as for the second person identifier to be associated with the given object identifier, whereby the second person identifier now identifies the second person as having the given relationship to the given object in the first database.

8. The computer-implemented method of claim 7, further comprising:

notifying a confirmation of the transfer of the given relationship by communicating a corresponding message to the user device.

9. The computer-implemented method of claim 1, wherein the relationships are ownership relations, whereby the transfer is a transfer of ownership.

10. The computer-implemented method of claim 1, wherein the preparatory steps are performed as part of a commissioning of the physical objects.

11. The computer-implemented method of claim 1, further comprising:
downloading, installing, and executing a program on the user device, wherein executing the program causes to configure the user device to be capable of interacting with each of the first database and the second database.

12. The computer-implemented method of claim 1, wherein at least one of the first database and the second database is a distributed system configured as a shared ledger.

13. A computer system for managing relationships between persons and physical objects based on identifiers, the computer system comprising:
one or more processors, one or more computer readable tangible storage devices, and program instructions stored on at least one of the one or more computer readable tangible storage devices for execution by at least one of the one or more processors, the program instructions executable to:
configure a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects;
verify, by interacting with the second database, that a given object of the physical objects is a genuine object, based on a given object identifier of the given object and a digital fingerprint detected from a physical fingerprint of the given object;
request, via the first database, a transfer of a given relationship from a first person to a second person with respect to the given object, based on the given object identifier and a person identifier of the second person; and
perform preparatory steps, wherein the program instructions for preparatory steps are executable to:
associate the physical objects with respective ones of the object identifiers;
obtain the digital fingerprints from respective ones of the physical fingerprints of the physical objects;
on the first database, store the object identifiers and the person identifiers, so as for the person identifiers to be associated with the respective ones of the object identifiers in the first database, a respective one of the person identifiers identifying a person as currently known to have a relationship to a respective one of the physical objects; and
on the second database, store the object identifiers and the digital fingerprints, so as for the digital fingerprints to be associated with the respective ones of the object identifiers; and
wherein the preparatory steps are performed using a computerized system of a manufacturer of the physical objects, wherein each of the first database and the second database is an external database, distinct from the computerized system but in data communication with the computerized system.

14. The computer system of claim 13, wherein the user device is further configured to detect the digital fingerprint from the physical fingerprint of the given object.

15. The computer system of claim 14, wherein the wherein the user device is further configured to:
automatically connect to the second database in view of verifying that the given object is a genuine object, upon detecting the digital fingerprint; and
automatically connect to the first database in view of requesting the transfer, upon obtaining confirmation from the second database that the given object is the genuine object.

16. The computer system of claim 13, wherein the user device is a smartphone, wherein the program instructions comprises specific instructions of an application program installed on the smartphone, wherein the specific instructions are executable to configure the user device to be capable of interacting with each of the first database and the second database.

17. A computer program product for managing relationships between persons and physical objects based on identifiers, the computer program product comprising one or more computer-readable tangible storage devices and program instructions stored on at least one of the one or more computer-readable tangible storage devices, the program instructions executable to:
configure a user device to be capable of interacting with each of a first database and a second database, wherein the first database stores pairs of object identifiers and person identifiers, wherein the object identifiers identify respective ones of the physical objects and the person identifiers identify respective ones of persons having relationships to the respective ones of the physical objects, wherein the second database stores pairs of object identifiers and digital fingerprints derived from physical fingerprints of the objects;
verify, by interacting with the second database, that a given object of the physical objects is a genuine object, based on a given object identifier of the given object and a digital fingerprint detected from a physical fingerprint of the given object;
request, via the first database, a transfer of a given relationship from a first person to a second person with respect to the given object, based on the given object identifier and a person identifier of the second person; and
perform preparatory steps, wherein the program instructions for preparatory steps are executable to:
associate the physical objects with respective ones of the object identifiers;
obtain the digital fingerprints from respective ones of the physical fingerprints of the physical objects;
on the first database, store the object identifiers and the person identifiers, so as for the person identifiers to be associated with the respective ones of the object identifiers in the first database, a respective one of the person identifiers identifying a person as currently known to have a relationship to a respective one of the physical objects; and
on the second database, store the object identifiers and the digital fingerprints, so as for the digital fingerprints to be associated with the respective ones of the object identifiers; and wherein the preparatory steps are performed using a computerized system of a manufacturer of the physical objects, wherein each of the first database and the second database is an external database, distinct from the computerized system but in data communication with the computerized system.

* * * * *